US012646495B2

(12) United States Patent
Scheller

(10) Patent No.: US 12,646,495 B2
(45) Date of Patent: Jun. 2, 2026

(54) FEEDBACK CANCELLATION DIVERGENCE PREVENTION

(71) Applicant: Starkey Laboratories, Inc., Eden Prairie, MN (US)

(72) Inventor: Thomas A. Scheller, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 154 days.

(21) Appl. No.: 17/453,764

(22) Filed: Nov. 5, 2021

(65) Prior Publication Data

US 2022/0148558 A1 May 12, 2022

Related U.S. Application Data

(60) Provisional application No. 63/110,573, filed on Nov. 6, 2020.

(51) Int. Cl.
*G10K 11/178* (2006.01)
*H04R 25/00* (2006.01)

(52) U.S. Cl.
CPC .. *G10K 11/17854* (2018.01); *G10K 11/17823* (2018.01); *H04R 25/453* (2013.01); *H04R 25/505* (2013.01); *H04R 2225/41* (2013.01)

(58) Field of Classification Search
None
See application file for complete search history.

(56) References Cited

U.S. PATENT DOCUMENTS 6,434,247 B1 8/2002 Kates et al.
2002/0057791 A1* 5/2002 Piket ...................... H04B 3/234 379/417
2015/0163346 A1* 6/2015 Adams ................ H04M 3/2236 379/406.08
2015/0189450 A1* 7/2015 Van Der Werf ..... H04R 25/456 381/318
2022/0028365 A1* 1/2022 Farahbakhsh .... G10K 11/17825

OTHER PUBLICATIONS

Kates, James, "Constrained adaptation for feedback cancellation in hearing aids", J. Acoust. Soc. Am. 106 (2), (Aug. 1999), 1010-1019.

* cited by examiner

*Primary Examiner* — Walter F Briney, III
(74) *Attorney, Agent, or Firm* — Schwegman Lundberg & Woessner, P.A.

(57) ABSTRACT

Improved adaptive feedback cancellation may be used to improve performance of audio amplification systems, such as hearing assistance devices, sound reinforcement systems, telephony, and other acoustic amplification and reproduction systems. This adaptive feedback cancellation allows a significant increase in the maximum stable gain of the amplification system, such as by increasing gain while reducing or eliminating feedback. This improves the audibility provided by an audio amplification system. This may provide particular improvements for hearing assistance devices that include open fittings or otherwise have substantial acoustic leakage. This adaptive feedback cancellation provides additional protection from a dynamically changing acoustic leakage by continually updating itself to model the changes, thereby providing increased gain while reducing or eliminating feedback.

20 Claims, 4 Drawing Sheets

FEEDBACK CANCELLATION DIVERGENCE PREVENTION

CROSS-REFERENCE TO RELATED APPLICATION

This patent application claims the benefit of U.S. Provisional Patent Application No. 63/110,573, filed Nov. 6, 2020, which is incorporated by reference herein in its entirety.

TECHNICAL FIELD

Embodiments described herein generally relate to audio device feedback cancellation.

BACKGROUND

Hearing assistance devices such as hearing aids may be used to amplify sound to make the sound audible for a person with hearing loss. A hearing aid may be limited in how much it can amplify a sound for the person. As the gain (e.g., amplification) of the hearing aid is increased, the acoustic leakage from the receiver to the microphone may result in feedback. Feedback may occur at a particular frequency when the closed loop gain of the hearing aid exceeds 0 dB, and when the closed loop phase response is at or close to zero degrees or multiples of 360 degrees. The maximum gain that can be provided without generating feedback (i.e., the hearing aid operation is stable) may be referred to as the Maximum Stable Gain (MSG). However, the MSG for a hearing aid may vary in different environments, such as when a user puts a phone to their ear, or when the hearing aid is used in another acoustically reflective environment. A challenge facing hearing aids is that hearing aid users are desirous of open fittings to improve natural sound for their own voice. However, these hearing aid open fittings result in a relatively low MSG, which can be insufficient to provide adequate audio amplification to compensate for their hearing loss.

Audio devices may reduce or eliminate feedback through feedback cancellation techniques. Audio devices that employ feedback cancellation include hearing assistance devices, cell phones, public address systems, two-way communication devices (e.g., conference microphones for telephony), and other audio devices. Feedback cancellation may include passive feedback cancellation (e.g., physically separating the microphone from the speaker) or adaptive feedback cancellation (AFBC). It is desirable to provide improved feedback mitigation for hearing aids and other audio amplification devices.

DESCRIPTION OF EMBODIMENTS

Figure 1:
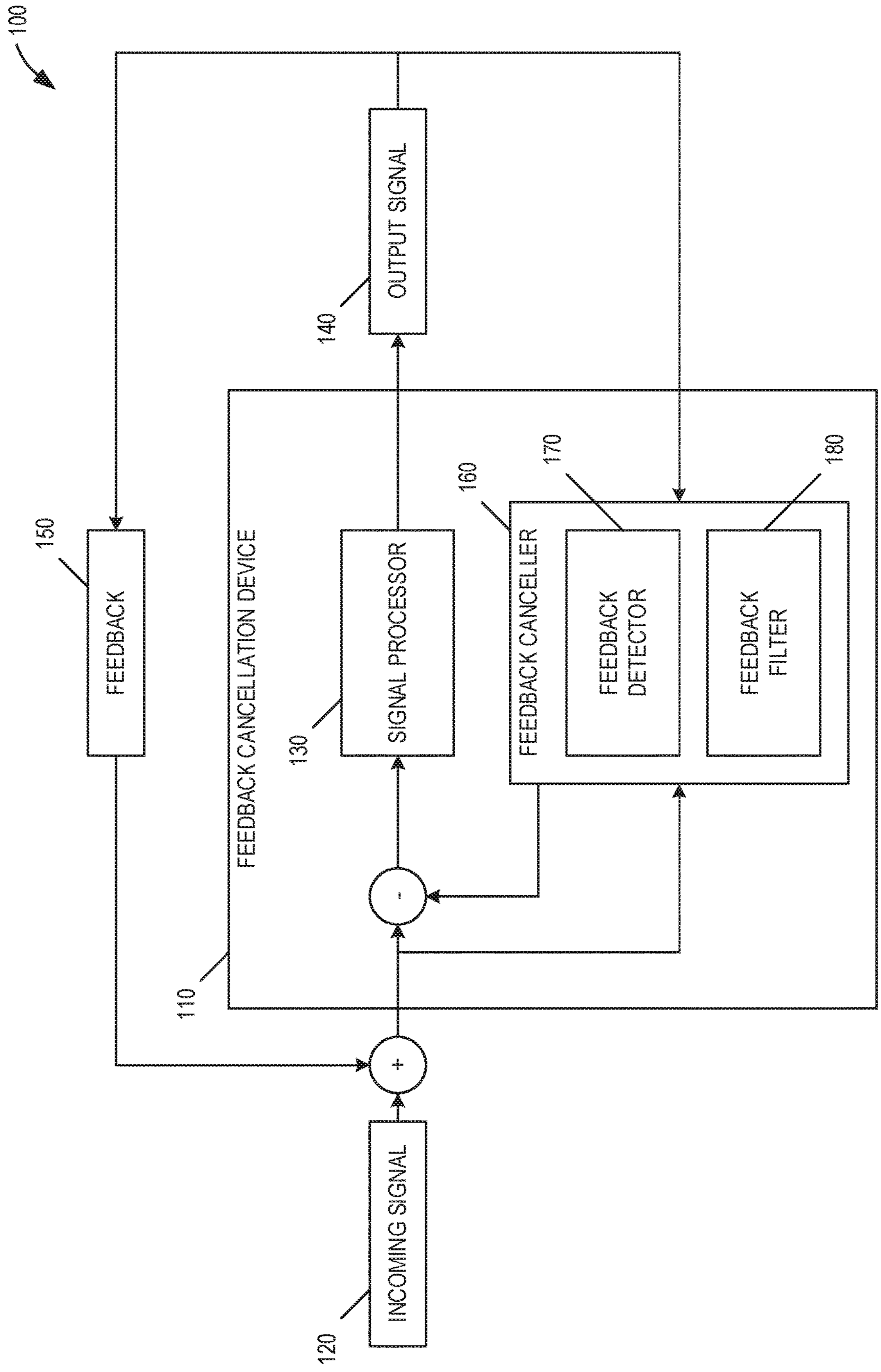
FIG. 1 is feedback cancellation system, in accordance with at least one embodiment of the invention.

The subject matter described herein provides technical solutions to address technical problems facing feedback mitigation. These technical solutions may include providing improved adaptive feedback cancellation (AFBC). In one example, an improved AFBC prevents the adaptive filter from diverging substantially from a desirable feedback cancellation filter state during quiet periods. During a quiet period, feedback cancellation may overcompensate for the reduction in sound, especially when the sound captured at the microphone is below the noise floor of the device. In particular, when the incoming signal drops below the noise floor, feedback cancellation may be unable to separate the signal or feedback from the noise, and may be unable to cancel feedback or characterize the acoustic leakage path. In operation, this overcompensation occurs when the feedback cancellation filter diverges in response to the reduced sound levels. When sound returns following a quiet period, the feedback cancellation filter is starting in a maladapted state (e.g., diverged filter state) and adapts toward a stable state, however this transition often results in an undesirable sound artifact such as a chirp or squeal. While filter divergence may be reduced by increasing the speed with which the feedback cancellation is configured to adapt to change in acoustic leakage, this quicker adaptation may cause the filter to diverge faster when the input signal is near or below the noise floor. By reducing or preventing filter state divergence, this improved AFBC may reduce or eliminate adaptation artifacts (e.g., entrainment) that may occur when sound returns after the quiet period.

This AFBC may also provide improved feedback performance for amplification systems other than hearing assistance devices, such as sound reinforcement systems, telephony, and other acoustic amplification and reproduction systems. This AFBC may provide particular improvements for hearing assistance devices that include fittings with substantial acoustic leakage. For example, hearing assistance device users may prefer open fittings to improve natural sound for their own voice, however these open fitting designs increase acoustic leakage. Additionally, hearing assistance devices may be more affected by acoustic leakage caused by changes in the acoustic environment, such as when a user brings a flat phone surface to an ear. An AFBC provides the additional protection from a dynamically changing acoustic leakage by continually updating itself to model the changes, thereby providing increased gain while reducing or eliminating acoustic leakage feedback. These feedback mitigation solutions will be described with respect to hearing aids, though these solutions may be applied to any sound amplification devices that include feedback cancellation schemes.

This description of embodiments of the present subject matter refers to subject matter in the accompanying drawings, which show, by way of illustration, specific aspects and embodiments in which the present subject matter may be practiced. These embodiments are described in sufficient detail to enable those skilled in the art to practice the present subject matter. References to "an," "one," or "various" embodiments in this disclosure are not necessarily to the same embodiment, and such references contemplate more than one embodiment. The above detailed description is demonstrative and not to be taken in a limiting sense. The scope of the present subject matter is defined by the appended claims, along with the full scope of legal equivalents to which such claims are entitled.

FIG. 1 is feedback cancellation system 100, in accordance with at least one embodiment of the invention. System 100 may include a feedback cancellation device 110, such as a hearing assistance device. The feedback cancellation device 110 may receive an incoming signal 120 (e.g., input signal), such as speech or another sound to be amplified. The incoming signal 120 may be fed into the feedback cancellation device 110 and routed to a signal processor 130. The signal processor 130 may apply a gain to amplify the incoming signal 120 and generate an output signal 140. A portion of the output signal 140 may be fed as an input back into the feedback cancellation device 110 in the form of feedback 150, such as acoustic leakage feedback. As the feedback 150 is added to the incoming signal 120, the feedback 150 is amplified by the feedback cancellation device 110 and becomes an increasingly large component of the output signal 140.

To reduce or eliminate feedback 150, the feedback cancellation system 100 includes a feedback canceller 160, such as an AFBC. The feedback canceller 160 may include a feedback detector 160 and a feedback filter 170. The feedback canceller 160 may receive the incoming signal 120 and the output signal 140, and the feedback detector 170 may identify feedback based on a comparison between the incoming signal 120 and the output signal 140. Using the identified feedback, the feedback filler 180 may be used to reduce or eliminate (e.g., cancel) the feedback portion of the output signal 140. The isolated feedback portion may be subtracted 190 from the combined incoming signal 120 and feedback 150, which may reduce or eliminate the feedback 150, such as acoustic leakage feedback.

The feedback cancellation system 100 may detect and reduce or eliminate a short-term feedback signal (e.g., a whoop signal). The short-term feedback signal may arise when the acoustic leakage changes quickly by a large amount, such as when a user brings a phone or other acoustically reflective surface in proximity to the feedback cancellation device 110. In an example, feedback detector 170 may detect a short-term feedback signal before it is audible to a user, and the feedback filter 180 may be used to reduce or eliminate the short-term feedback signal. The feedback detector 170 and the feedback filter 180 may be configured to react quickly to the short-term feedback signal, such as to reduce or eliminate the short-term feedback signal while providing additional time to model the new acoustic leakage.

Figure 2:
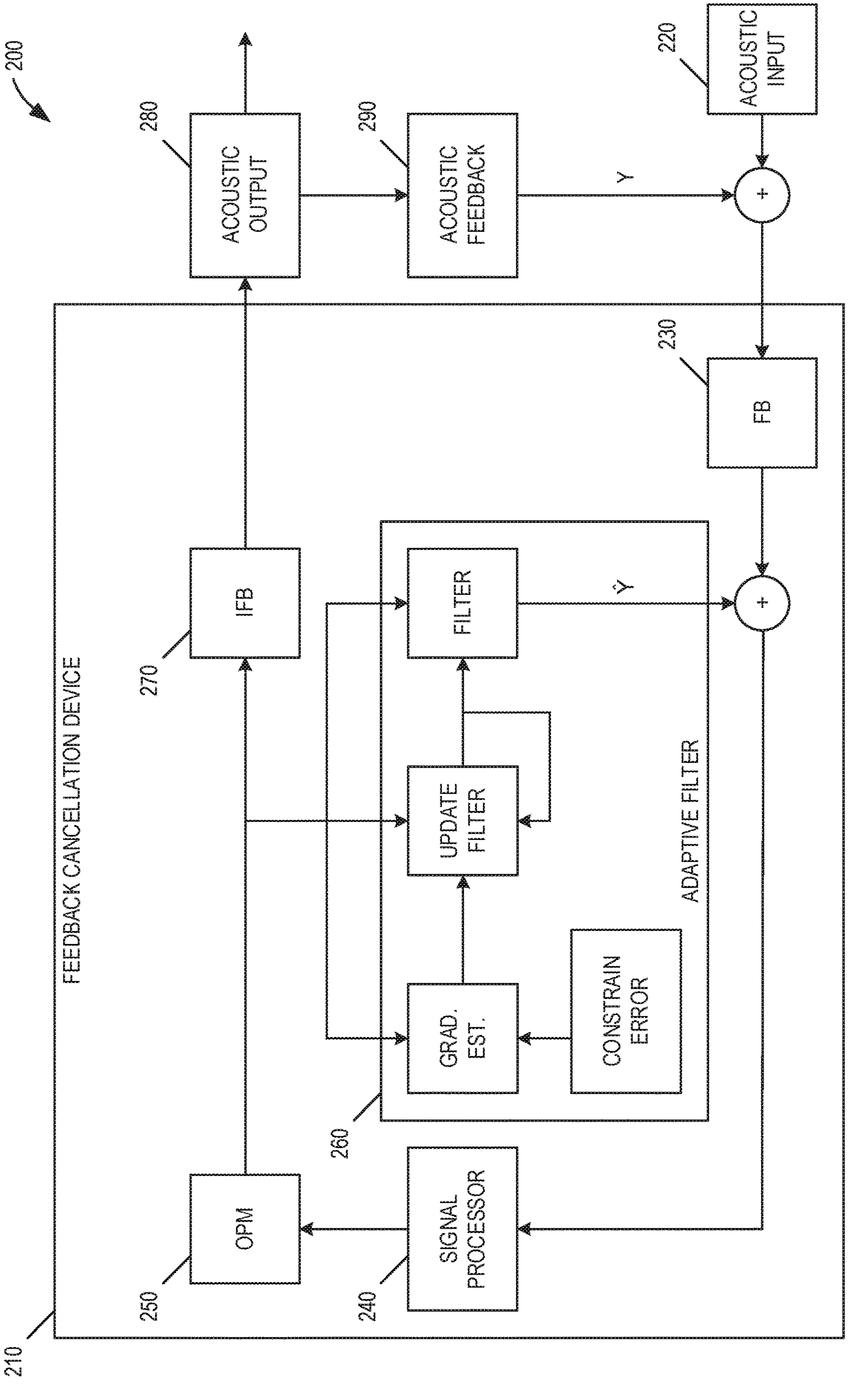
FIG. 2 is feedback cancellation system, in accordance with at least one embodiment of the invention.

FIG. 2 is feedback cancellation system 200, in accordance with at least one embodiment of the invention. System 200 may include a feedback cancellation device 210, such as a hearing assistance device. The feedback cancellation device 210 may receive an acoustic input signal 220. The acoustic input signal 220 may be transduced by a microphone into a digital or analog input signal. The transduced signal may be fed through a filter bank 230 to a signal processor 240. The output of the signal processor 240 may be fed into an output phase modulator OPM 250 to shift the phase of the output of the signal processor 240. This OPM 250 may be used to decorrelate the output signal from the input signal, which helps to both suppress feedback and to converge more quickly on an inverse signal. The phase-shifted output of the OPM 250 may be fed into an adaptive filter 260 and an inverse filter bank 270. The output of the inverse filter bank 270 may be transduced into an acoustic output 280. An acoustic feedback signal 290 may include a portion of the acoustic output 280 (e.g., acoustic leakage feedback) that is fed back and combined with the acoustic input 220.

The adaptive filter 260 may be configured to reduce or eliminate the acoustic feedback 290, such as feedback due to acoustic leakage. The adaptive filter 260 may include a subband finite impulse response (FIR) filter. The adaptive filter 260 may be used to model the acoustic feedback 290. The adaptive filter 260 may generate an estimated feedback signal that is 180 degrees out of phase with the feedback portion of the transduced audio input, and the estimated feedback signal may be added to the transduced audio input to reduce or eliminate feedback while allowing the desired portion of the transduced audio input to pass through to the signal processor 240.

The adaptive filter mode may be subject to entrainment artifacts, which may include the adaptive filter erroneously interpreting a tonal incoming signal as feedback and cancelling the tonal information. Entrainment artifacts typically occur in the presence of periodic stimulus, such as music and speech. The faster the adaptive filter 260 is configured to adapt to change in acoustic leakage, the more the adaptive filter mode may be subject to entrainment artifacts. While entrainment may be reduced by slowing the speed with which the adaptive filter 260 is configured to adapt to change in acoustic leakage, this slowed adaptation may result in reduced feedback cancellation performance. The OPM 250 may be used to reduce or eliminate entrainment in addition to reducing feedback because of its decorrelation properties. In an example, the OPM 250 applies a phase modulation to the hearing aid audio signal before it is sent through the IFB 270 and reproduced as acoustic output 280. The phase modulation applied by the OPM 250 reduces or eliminates any bias on the adaptive filter 260 due to the periodic microphone signal, and allows the adaptive filter 260 to model the acoustic leakage more efficiently.

The adaptive filter 260 may be configured to operate in various modes, such as an adaptive mode, a static mode, or a modified adaptive filter mode. The operation of the adaptive filter 260 may be changed based on selecting or changing filter coefficients for a subband filter within the adaptive filter 260. In the adaptive mode, the subband filter coefficients are continually updated using an adaptive technique such as normalized least mean squares (NLMS) filter to characterize (e.g., model) the non-stationary acoustic leakage path. In the static mode, the subband filter coefficients are set to reflect a static representation of the acoustic leakage path. The static representation of the acoustic feedback 290 due to acoustic leakage may be determined during an FBC initialization. The FBC initialization may include playing a wideband complex tone out of a hearing assistance device speaker for a short duration (e.g., a few seconds), and an averaged microphone response is used to estimate a robust model of the acoustic feedback 290. The adaptive filter 260 may be configured to operate in a modified adaptive filter mode. In an example, the modified adaptive filter mode may include freezing filter coefficients at their current coefficient values for some period of time. In another example, the modified adaptive filter mode may include biasing the NLMS algorithm to adjust filter coefficients from current coefficient values toward static mode filter coefficient values.

The adaptive filter mode provides an improved feedback cancellation performance over the static mode. However, the adaptive filter mode relies on acoustic input to characterize the acoustic leakage path, whereas the static mode does not use an input signal. When the adaptive filter 260 is operating in adaptive filter mode, when the incoming signal drops below the noise floor, the adaptive filter 260 may be unable to separate the signal or feedback from the noise, and may be unable to characterize the acoustic leakage path or cancel feedback. Without an input signal, the adaptive filter 260 may update the adaptive filter coefficients in an unpredictable manner, which may leave the adaptive filter 260 in a diverged state when an input signal returns. In an example, when the adaptive filter 260 is operating in adaptive filter mode, the onset of a new input signal may result in a chirp or other unwanted acoustic discontinuity. While filter convergence time may be reduced by increasing the speed with which the adaptive filter 260 is configured to adapt to change in acoustic leakage, this quicker adaptation may cause the filter to diverge faster when the input signal is near or below the noise floor.

The adaptive filter 260 may transition from an adaptive filter mode to the modified adaptive filter mode, such as in response to detecting that little or no acoustic input is being provided to the feedback cancellation device 210. The modified adaptive filter mode may detect when the input signal is near or below the noise floor, such as by setting a noise threshold (e.g., boundary condition) on the input signal level. In an example, in response to detecting when input signal falls below the noise threshold, the modified adaptive filter mode may freeze the filter coefficients at the state just before the input level dropped below a coefficient freezing threshold. The coefficient freezing threshold may be selected based on a minimum sound input level that will produce convergence of the filter coefficients. When the input signal rises above the coefficient freezing threshold, the filter coefficients may be unfrozen and once again continually updated based on the input signal. In an example, in response to detecting when then input signal falls below the noise threshold, the modified adaptive filter mode may gradually adapt filter coefficients toward a set of initialized filter values. The initialized filter values may include a known good set of coefficient values that represented the acoustic feedback path in a single, common condition. In an example, the initialized filter values may be estimated based on the hearing assistance device, such as the device style, device venting (e.g., acoustic coupling to the ear), and acoustics of the patient using the hearing assistance device. In another example, the initialized filter values may be determined during an FBC initialization, which may provide more accurate filter values than estimated values. In yet another example, the initialized filter values may be derived from a long-term average of historical filter coefficients stored in the hearing aid during use.

The noise threshold may be selected to provide improved performance of the adaptive filter 260 in modified adaptive filter mode. The noise threshold may be implemented as a static threshold, such as by selecting an initial noise threshold based on estimated noise floor values, and updating the threshold based on variation of the noise floor values during FBC initialization or other hearing assistance device operation. The noise threshold may be implemented as a dynamic threshold, such as by selecting an initial noise threshold and continually updating the noise threshold based on the current dynamic gain levels applied and the known acoustic feedback path calculated during initialization. This initialization and revision of the noise threshold may improve the feedback cancellation performance in modified adaptive filter mode, such as by avoiding a threshold that is too high (e.g., static mode operation) and avoiding a threshold that is too low (e.g., operating in non-modified adaptive filter mode).

Figure 3:
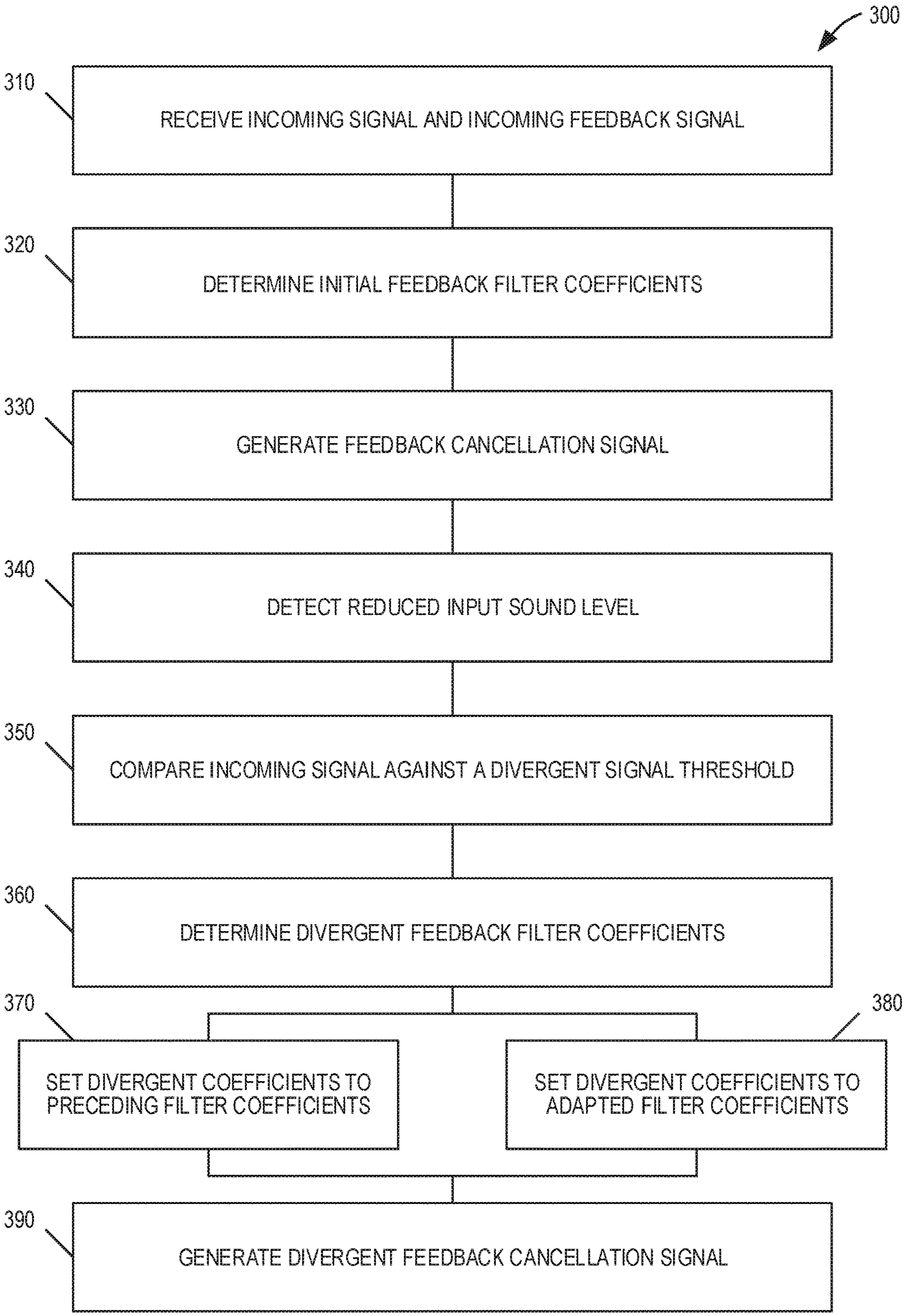
FIG. 3 is a feedback cancellation filter determination method, in accordance with at least one embodiment of the invention.

The adaptive filter 260 may transition from an adaptive filter mode to the modified adaptive filter mode, such as in response to detecting a filter divergence, such as by detecting an increase in the variance in the filter coefficients. Such a filter divergence may indicate that little or no acoustic input is being provided to the feedback cancellation device 210, The modified adaptive filter mode may detect the filter divergence by comparing the variance in the filter coefficients against a variance coefficient threshold, or by comparing a rate of change in the variance against a variance coefficient rate increase threshold. The determination of the variance coefficient threshold or the variance coefficient rate increase threshold may be specific to the hearing assistance device, and may be determined based on the hearing assistance product or product type. This device-specific determination is in in contrast with the initialized filter values, which may be defined based on values determined during a fitting or determined based on historical data, FIG. 3 is a feedback cancellation filter determination method 300, in accordance with at least one embodiment of the invention. Method 300 may include receiving 310 an incoming signal and an incoming feedback signal at a hearing assistance device. Method 300 may include determining 320 a plurality of initial feedback filter coefficients based on the incoming signal and an incoming feedback signal. Method 300 may include generating 330 a feedback cancellation signal based on the initial feedback filter coefficients. The feedback cancellation signal may be configured to be combined with the incoming signal and an incoming feedback signal to cancel the incoming feedback signal. Method 300 may include detecting 340 a reduced input sound level within the incoming signal. Detection 340 of the reduced input sound level may occur prior or subsequent to the generation of the feedback cancellation signal.

Method 300 may include comparing 350 the incoming signal against a divergent signal threshold. The detection of the reduced input sound level within the incoming signal is based on a characteristic of the incoming signal falling below the divergent signal threshold. In an example, the divergent signal threshold includes a static threshold, and the static threshold determined during the initial fitting. In another example, the divergent signal threshold includes a dynamic threshold, and the divergent signal threshold is determined based on the plurality of initial feedback filter coefficients and based on a known acoustic feedback path determined during the initial fitting Method 300 may include determining 360 a plurality of divergent feedback filter coefficients in response to the detection of the reduced input sound level. In an example, the determination 360 of the plurality of divergent feedback filter coefficients includes setting 370 the plurality of divergent feedback filter coefficients to a preceding state of filter coefficients. The plurality of preceding filter coefficients may correspond to a preceding state of filter coefficients immediately prior to the detection of the reduced input sound level, and the setting 370 of the plurality of divergent feedback filter coefficients may cause the hearing assistance device to operate in a static filter mode by freezing the current values. In an example, the determination 360 of the plurality of divergent feedback filter coefficients includes setting 380 the plurality of divergent feedback filter coefficients to the plurality of adapted filter coefficients. The setting 380 of the plurality of divergent feedback filter coefficients to the plurality of adapted filter coefficients may cause the hearing assistance device to operate in a modified adaptive filter mode. In this modified adaptive filter mode, the adaptive filter coefficients are adjusted gradually from current adaptive filter coefficients toward a static mode based on a plurality of initialized feedback filter coefficient values. The plurality of initialized feedback filter coefficient values may be determined based on an initial fitting of the hearing assistance device. Method 300 may include generating 390 a divergent feedback cancellation signal based on the divergent feedback filter coefficients.

Figure 4:
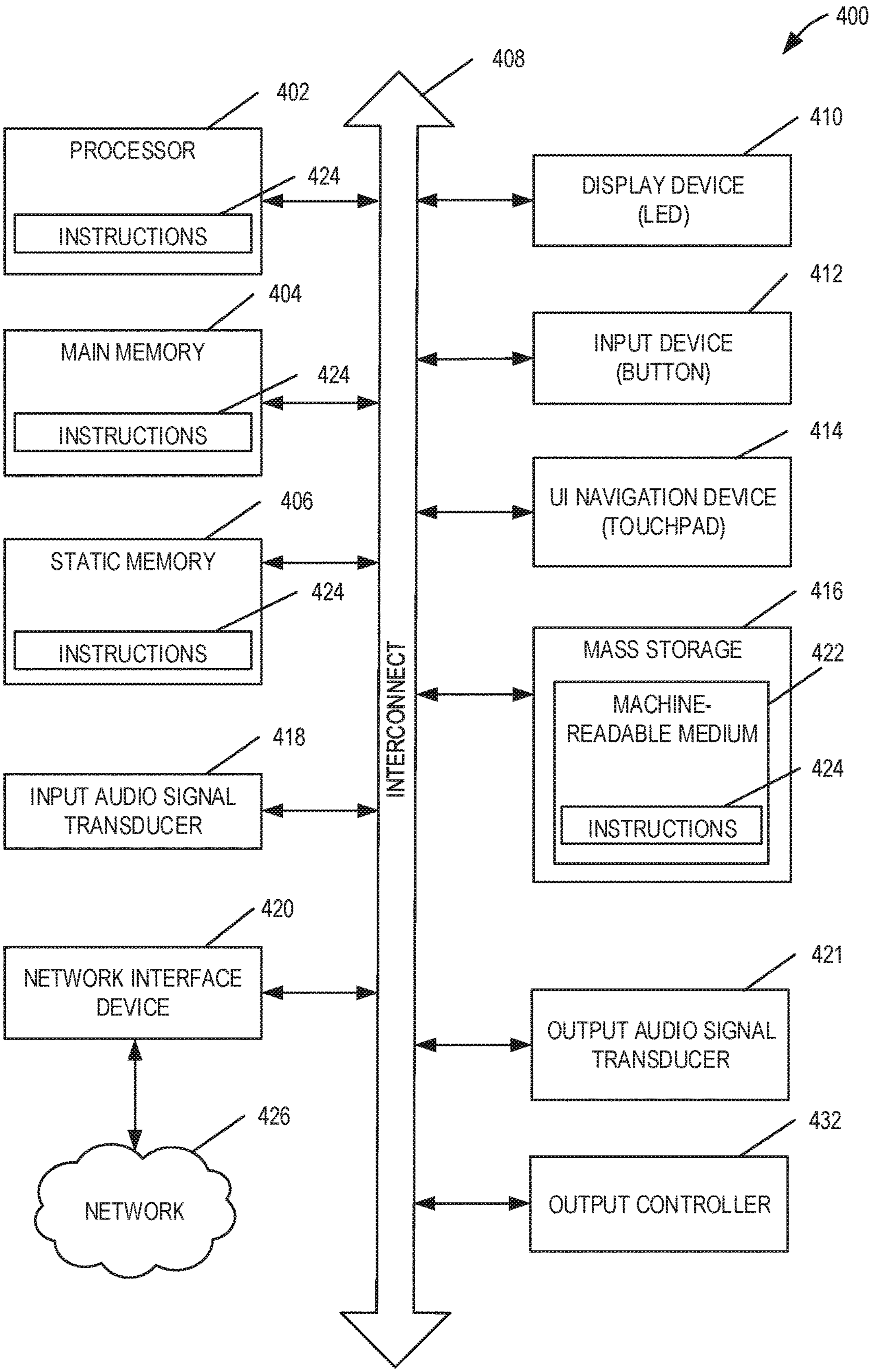
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically. Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIM), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various embodiments of the present subject matter may include a hearing assistance device. Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. In various embodiments, detection and reduction or elimination of feedback includes at least one input transducer and at least one output transducer. These input and output transducers may generate feedback when they are within the same domain, such as a pair of acoustic transceivers, a pair of magnetic transceivers, or other types of input and output transducers within the same domain. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples, drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Diverse types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Various embodiments of the present subject matter support wireless communications with a hearing assistance device. In various embodiments, the wireless communications can include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments, the communications are optical communications, such as infrared communications. In various embodiments, the communications are inductive communications. In various embodiments, the communications are ultrasonic communications. Although embodiments of the present system may be demonstrated as radio communication systems, it is possible that other forms of wireless communications can be used. It is understood that past and present standards can be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fiber-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two-way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer. The present subject matter may be employed in hearing assistance devices, such as headsets, hearing aids, headphones, and similar hearing devices. The present subject matter may be employed in hearing assistance devices having additional sensors. Such sensors include, but are not limited to, magnetic field sensors, telecoils, temperature sensors, accelerometers, and proximity sensors. The present subject matter may be employed in amplification systems other than hearing assistance devices, such as sound reinforcement systems, telephony, and other acoustic amplification and reproduction systems.

The present subject matter is demonstrated for hearing assistance devices, including hearing aids, including but not limited to, behind-the-ear (BTE), in-the-ear (ITE), in-the-canal (ITC), receiver-in-canal (MC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard fitted, open fitted and/or occlusive fitted. It is understood that other hearing assistance devices not expressly stated herein may be used in conjunction with the present subject matter.

Throughout this specification, plural instances may implement components; operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Example 1 is a hearing assistance device feedback cancellation method, the method comprising: receive an input signal and a feedback signal at a hearing assistance device; determine a plurality of initial feedback filter coefficients based on the input signal and the feedback signal; generate a feedback cancellation signal based on the initial feedback filter coefficients, the feedback cancellation signal configured to be combined with the input signal and the feedback signal to cancel the feedback signal; detect a reduced input sound level within the input signal, the reduced input sound level indicating an ambient sound level is substantially equal to or below a noise floor; determine a plurality of adapted feedback filter coefficients in response to the detection of the reduced input sound level, the adapted feedback filter coefficients to reduce acoustic leakage feedback; and generate an adapted feedback cancellation signal based on the adapted feedback filter coefficients.

In Example 2, the subject matter of Example 1 optionally includes wherein the detection of the reduced input sound level includes determining an ambient sound level is substantially equal to or below a noise floor.

In Example 3, the subject matter of any one or more of Examples 1-2 optionally include wherein the detection of the reduced input sound level includes detecting a filter coefficient divergence.

In Example 4, the subject matter of any one or more of Examples 2-3 optionally include wherein the detection of the reduced input sound level includes determining that the input signal is substantially equal to or below a noise floor.

In Example 5, the subject matter of any one or more of Examples 2-4 optionally include wherein the detection of the reduced input sound level includes determining that the feedback signal is substantially equal to or below a feedback signal noise floor.

In Example 6, the subject matter of any one or more of Examples 2-5 optionally include wherein the detection of the reduced input sound level within the input signal is subsequent to the generation of the feedback cancellation signal.

In Example 7, the subject matter of any one or more of Examples 2-6 optionally include identifying a plurality of preceding filter coefficients, the plurality of preceding filter coefficients corresponding to a preceding state of filter coefficients immediately prior to the detection of the reduced input sound level; wherein the determination of the plurality of adapted feedback filter coefficients includes setting the plurality of adapted feedback filter coefficients to the preceding state of filter coefficients.

In Example 8, the subject matter of any one or more of Examples 2-7 optionally include generating a plurality of adapted filter coefficients, the plurality of adapted filter coefficients based on adapting the plurality of adapted feedback filter coefficients toward a plurality of initialized feedback filter coefficient values; wherein the determination of the plurality of adapted feedback filter coefficients includes setting the plurality of adapted feedback filter coefficients to the plurality of adapted filter coefficients.

In Example 9, the subject matter of Example 8 optionally includes wherein the plurality of initialized feedback filter coefficient values is determined based on an initial fitting of the hearing assistance device.

In Example 10, the subject matter of any one or more of Examples 8-9 optionally include wherein the plurality of initialized feedback filter coefficient values is determined based on at least one identified characteristic of a hearing assistance device fitting without requiring the hearing assistance device fitting.

In Example 11, the subject matter of any one or more of Examples 8-10 optionally include wherein the plurality of initialized feedback filter coefficient values is determined based on a long-term average of historical filter coefficients stored in the hearing assistance device during use.

In Example 12, the subject matter of any one or more of Examples 8-11 optionally include wherein the long-term average of historical filter coefficients is determined based on a machine learning analysis of historical fitting data.

In Example 13, the subject matter of any one or more of Examples 2-12 optionally include comparing the input signal against a divergent signal threshold, wherein the detection of the reduced input sound level within the input signal is based on a characteristic of the input signal falling below the divergent signal threshold.

In Example 14, the subject matter of Example 13 optionally includes wherein: the divergent signal threshold includes a static threshold; and the static threshold determined during the initial fitting.

In Example 15, the subject matter of any one or more of Examples 13-14 optionally include wherein: the divergent signal threshold includes a dynamic threshold; and the divergent signal threshold is determined based on the plurality of initial feedback filter coefficients and based on a known acoustic feedback path determined during the initial fitting.

Example 16 is one or more machine-readable medium including instructions, which when executed by a computing system; cause the computing system to perform any of the methods of Examples 1-15.

Example 17 is an apparatus comprising means for performing any of the methods of Examples 1-15.

Example 18 is a hearing assistance device feedback cancellation system, the system comprising: an input transducer to transduce an acoustic signal into an input signal, the input signal including an input signal and a feedback signal;

a memory; a processor configured to execute instructions to: determine a plurality of initial feedback filter coefficients based on the input signal and the feedback signal; generate a feedback cancellation signal based on the initial feedback filter coefficients, the feedback cancellation signal configured to be combined with the input signal and the feedback signal to cancel the feedback signal; detect a reduced input sound level within the input signal subsequent to the generation of the feedback cancellation signal; determine a plurality of adapted feedback filter coefficients in response to the detection of the reduced input sound level, the adapted feedback filter coefficients to reduce acoustic leakage feedback; generate an adapted feedback cancellation signal based on the adapted feedback filter coefficients; and generate an adapted feedback cancelled output based on a combination of the adapted feedback cancellation signal and the input signal; and an output transducer to transduce the adapted feedback cancelled output.

In Example 19, the subject matter of Example 18 optionally includes wherein the reduced input sound level indicates an ambient sound level is substantially equal to or below a noise floor.

In Example 20, the subject matter of any one or more of Examples 18-19 optionally include wherein the detection of the reduced input sound level includes detecting a filter coefficient divergence.

In Example 21, the subject matter of any one or more of Examples 19-20 optionally include wherein the detection of the reduced input sound level includes determining that the input signal is substantially equal to or below a noise floor.

In Example 22, the subject matter of any one or more of Examples 19-21 optionally include wherein the detection of the reduced input sound level includes determining that the feedback signal is substantially equal to or below a feedback signal noise floor.

In Example 23, the subject matter of any one or more of Examples 19-22 optionally include wherein the detection of the reduced input sound level within the input signal is subsequent to the generation of the feedback cancellation signal.

In Example 24, the subject matter of any one or more of Examples 19-23 optionally include wherein the processor is further configured to execute instructions to identify a plurality of preceding filter coefficients, the plurality of preceding filter coefficients corresponding to a preceding state of filter coefficients immediately prior to the detection of the reduced input sound level; wherein the determination of the plurality of adapted feedback filter coefficients includes setting the plurality of adapted feedback filter coefficients to the preceding state of filter coefficients.

In Example 25, the subject matter of any one or more of Examples 19-24 optionally include wherein the processor is further configured to execute instructions to generate a plurality of adapted filter coefficients, the plurality of adapted filter coefficients based on adapting the plurality of adapted feedback filter coefficients toward a plurality of initialized feedback filter coefficient values; wherein the determination of the plurality of adapted feedback filter coefficients includes setting the plurality of adapted feedback filter coefficients to the plurality of adapted filter coefficients.

In Example 26, the subject matter of Example 25 optionally includes wherein the plurality of initialized feedback filter coefficient values is determined based on an initial fitting of the hearing assistance device.

In Example 27, the subject matter of any one or more of Examples 25-26 optionally include wherein the plurality of initialized feedback filter coefficient values is determined based on at least one identified characteristic of a hearing assistance device fitting without requiring the hearing assistance device fitting.

In Example 28, the subject matter of any one or more of Examples 25-27 optionally include wherein the plurality of initialized feedback filter coefficient values is determined based on a long-term average of historical filter coefficients stored in the hearing assistance device during use.

In Example 29, the subject matter of any one or more of Examples 25-28 optionally include wherein the long-term average of historical filter coefficients is determined based on a machine learning analysis of historical fitting data.

In Example 30, the subject matter of any one or more of Examples 19-29 optionally include wherein the processor is further configured to execute instructions to compare the input signal against a divergent signal threshold, wherein the detection of the reduced input sound level within the input signal is based on a characteristic of the input signal falling below the divergent signal threshold.

In Example 31, the subject matter of Example 30 optionally includes wherein: the divergent signal threshold includes a static threshold; and the static threshold determined during the initial fitting.

In Example 32, the subject matter of any one or more of Examples 30-31 optionally include wherein: the divergent signal threshold includes a dynamic threshold; and the divergent signal threshold is determined based on the plurality of initial feedback filter coefficients and based on a known acoustic feedback path determined during the initial fitting.

Example 33 is at least one non-transitory machine-readable storage medium, comprising a plurality of instructions that, responsive to being executed with processor circuitry of a computer-controlled device, cause the computer-controlled device to: receive an input signal and a feedback signal at a hearing assistance device; determine a plurality of initial feedback filter coefficients based on the input signal and the feedback signal; generate a feedback cancellation signal based on the initial feedback filter coefficients, the feedback cancellation signal configured to be combined with the input signal and the feedback signal to cancel the feedback signal; detect a reduced input sound level within the input signal subsequent to the generation of the feedback cancellation signal; determine a plurality of adapted feedback filter coefficients in response to the detection of the reduced input sound level, the adapted feedback filter coefficients to reduce acoustic leakage feedback; and generate an adapted feedback cancellation signal based on the adapted feedback filter coefficients.

In Example 34, the subject matter of Example 33 optionally includes wherein the detection of the reduced input sound level includes determining an ambient sound level is substantially equal to or below a noise floor.

In Example 35, the subject matter of any one or more of Examples 33-34 optionally include wherein the detection of the reduced input sound level includes detecting a filter coefficient divergence.

In Example 36, the subject matter of any one or more of Examples 34-35 optionally include wherein the detection of the reduced input sound level includes determining that the input signal is substantially equal to or below a noise floor.

In Example 37, the subject matter of any one or more of Examples 34-36 optionally include wherein the detection of the reduced input sound level includes determining that the feedback signal is substantially equal to or below a feedback signal noise floor.

In Example 38, the subject matter of any one or more of Examples 34-37 optionally include wherein the detection of the reduced input sound level within the input signal is subsequent to the generation of the feedback cancellation signal.

In Example 39, the subject matter of any one or more of Examples 34-38 optionally include the instructions further causing the computer-controlled device to identify a plurality of preceding filter coefficients, the plurality of preceding filter coefficients corresponding to a preceding state of filter coefficients immediately prior to the detection of the reduced input sound level; wherein the determination of the plurality of adapted feedback filter coefficients includes setting the plurality of adapted feedback filter coefficients to the preceding state of filter coefficients.

In Example 40, the subject matter of any one or more of Examples 34-39 optionally include the instructions further causing the computer-controlled device to generate a plurality of adapted filter coefficients, the plurality of adapted filter coefficients based on adapting the plurality of adapted feedback filter coefficients toward a plurality of initialized feedback filter coefficient values; wherein the determination of the plurality of adapted feedback filter coefficients includes setting the plurality of adapted feedback filter coefficients to the plurality of adapted filter coefficients.

In Example 41, the subject matter of Example 40 optionally includes wherein the plurality of initialized feedback filter coefficient values is determined based on an initial fitting of the hearing assistance device.

In Example 42, the subject matter of any one or more of Examples 40-41 optionally include wherein the plurality of initialized feedback filter coefficient values is determined based on at least one identified characteristic of a hearing assistance device fitting without requiring the hearing assistance device fitting.

In Example 43, the subject matter of any one or more of Examples 40-42 optionally include wherein the plurality of initialized feedback filter coefficient values is determined based on a long-term average of historical filter coefficients stored in the hearing assistance device during use.

In Example 44, the subject matter of any one or more of Examples 40-43 optionally include wherein the long-term average of historical filter coefficients is determined based on a machine learning analysis of historical fitting data.

In Example 45, the subject matter of any one or more of Examples 34-44 optionally include the instructions further causing the computer-controlled device to compare the input signal against a divergent signal threshold, wherein the detection of the reduced input sound level within the input signal is based on a characteristic of the input signal falling below the divergent signal threshold.

In Example 46, the subject matter of Example 45 optionally includes wherein: the divergent signal threshold includes a static threshold; and the static threshold determined during the initial fitting.

In Example 47, the subject matter of any one or more of Examples 45-46 optionally include wherein: the divergent signal threshold includes a dynamic threshold; and the divergent signal threshold is determined based on the plurality of initial feedback filter coefficients and based on a known acoustic feedback path determined during the initial fitting.

Example 48 is a hearing assistance device feedback cancellation apparatus, the apparatus comprising: means for receiving an input signal and a feedback signal at a hearing assistance device; means for determining a plurality of initial feedback filter coefficients based on the input signal and the feedback signal; means for generating a feedback cancellation signal based on the initial feedback filter coefficients, the feedback cancellation signal configured to be combined with the input signal and the feedback signal to cancel the feedback signal; means for detecting a reduced input sound level within the input signal subsequent to the generation of the feedback cancellation signal; means for determining a plurality of adapted feedback filter coefficients in response to the detection of the reduced input sound level; the adapted feedback filter coefficients to reduce acoustic leakage feedback; and means for generating an adapted feedback cancellation signal based on the adapted feedback filter coefficients.

In Example 49, the subject matter of Example 48 optionally includes wherein the means for detecting of the reduced input sound level includes means for determining an ambient sound level is substantially equal to or below a noise floor.

In Example 50, the subject matter of any one or more of Examples 48-49 optionally include wherein the means for detecting the reduced input sound level includes means for detecting a filter coefficient divergence.

In Example 51, the subject matter of any one or more of Examples 49-50 optionally include wherein the means for detecting the reduced input sound level includes means for determining that the input signal is substantially equal to or below a noise floor.

In Example 52, the subject matter of any one or more of Examples 49-51 optionally include wherein the means for detecting the reduced input sound level includes means for determining that the feedback signal is substantially equal to or below a feedback signal noise floor.

In Example 53, the subject matter of any one or more of Examples 49-52 optionally include wherein the detection of the reduced input sound level within the input signal is subsequent to the generation of the feedback cancellation signal.

In Example 54, the subject matter of any one or more of Examples 49-53 optionally include means for identifying a plurality of preceding filter coefficients, the plurality of preceding filter coefficients corresponding to a preceding state of filter coefficients immediately prior to the detection of the reduced input sound level; wherein the determination of the plurality of adapted feedback filter coefficients includes setting the plurality of adapted feedback filter coefficients to the preceding state of filter coefficients.

In Example 55, the subject matter of any one or more of Examples 49-54 optionally include means for generating a plurality of adapted filter coefficients, the plurality of adapted filter coefficients based on adapting the plurality of adapted feedback filter coefficients toward a plurality of initialized feedback filter coefficient values; wherein the determination of the plurality of adapted feedback filter coefficients includes setting the plurality of adapted feedback filter coefficients to the plurality of adapted filter coefficients.

In Example 56, the subject matter of Example 55 optionally includes wherein the plurality of initialized feedback filter coefficient values is determined based on an initial fitting of the hearing assistance device.

In Example 57, the subject matter of any one or more of Examples 55-56 optionally include wherein the plurality of initialized feedback filter coefficient values is determined based on at least one identified characteristic of a hearing assistance device fitting without requiring the hearing assistance device fitting.

In Example 58, the subject matter of any one or more of Examples 55-57 optionally include wherein the plurality of initialized feedback filter coefficient values is determined based on a long-term average of historical filter coefficients stored in the hearing assistance device during use.

In Example 59, the subject matter of any one or more of Examples 55-58 optionally include wherein the long-term average of historical filter coefficients is determined based on a machine learning analysis of historical fitting data.

In Example 60, the subject matter of any one or more of Examples 49-59 optionally include means for comparing the input signal against a divergent signal threshold, wherein the means for detecting the reduced input sound level within the input signal is based on a characteristic of the input signal falling below the divergent signal threshold.

In Example 61, the subject matter of Example 60 optionally includes wherein: the divergent signal threshold includes a static threshold; and the static threshold determined during the initial fitting.

In Example 62, the subject matter of any one or more of Examples 60-61 optionally include wherein: the divergent signal threshold includes a dynamic threshold; and the divergent signal threshold is determined based on the plurality of initial feedback filter coefficients and based on a known acoustic feedback path determined during the initial fitting.

Example 63 is one or more non-transitory machine-readable medium including instructions, which when executed by a machine, cause the machine to perform operations of any of the operations of Examples 1-54.

Example 64 is an apparatus comprising means for performing any of the operations of Examples 1-54.

Example 65 is a system to perform the operations of any of the Examples 1-54.

Example 66 is a method to perform the operations of any of the Examples 1-54.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A hearing assistance device feedback cancellation method, the method comprising:

receiving an input signal and a feedback signal at a hearing assistance device;

determining a plurality of initial feedback filter coefficients based on the input signal and the feedback signal;

generating a feedback cancellation signal based on the initial feedback filter coefficients, the feedback cancellation signal configured to be combined with the input signal and the feedback signal to cancel the feedback signal;

detecting a reduced input sound level within the input signal, the reduced input sound level indicating an ambient sound level is substantially equal to or below a noise threshold, the noise threshold determined based on estimated noise floor values;

determining a plurality of preceding filter coefficients in response to the detection of the reduced input sound level, the plurality of preceding filter coefficients corresponding to a preceding state of filter coefficients immediately prior to the detection of the reduced input sound level;

determining a plurality of adapted feedback filter coefficients in response to the detection of the reduced input sound level, the plurality of adapted filter coefficients determined based on adapting the plurality of adapted feedback filter coefficients from the plurality of preceding filter coefficients toward a plurality of initialized feedback filter coefficient values, the plurality of adapted feedback filter coefficients to reduce acoustic leakage feedback, the plurality of initialized feedback filter coefficient values determined based on an initial fitting of the hearing assistance device; and generating an adapted feedback cancellation signal based on the plurality of adapted feedback filter coefficients.

2. The method of claim 1, further including:

determining a plurality of varying noise floor values during operation of the hearing assistance device; and updating the noise threshold based on the plurality of varying noise floor values.

3. The method of claim 2, wherein the detection of the reduced input sound level includes determining that the input signal is substantially equal to or below the noise threshold.

4. The method of claim 2, further including identifying a plurality of preceding filter coefficients, the plurality of preceding filter coefficients corresponding to a preceding state of filter coefficients immediately prior to the detection of the reduced input sound level;

wherein the determination of the plurality of adapted feedback filter coefficients includes setting the plurality of adapted feedback filter coefficients to the preceding state of filter coefficients.

5. The method of claim 2, further including comparing the input signal against a divergent signal threshold, wherein the detection of the reduced input sound level within the input signal is based on a characteristic of the input signal falling below the divergent signal threshold.

6. The method of claim 5, wherein:

the divergent signal threshold includes a dynamic threshold; and the dynamic threshold is determined based on a current state of the plurality of adapted feedback filter coefficients and based on a known acoustic feedback path determined during an initial fitting.

7. The method of claim 1, wherein the detection of the reduced input sound level includes detecting a filter coefficient divergence.

8. The method of claim 1, further including:

detecting that the ambient sound level has risen above the noise threshold;

determining, upon detecting that the ambient sound level has risen above the noise threshold, a threshold state of the plurality of adapted feedback filter coefficients;

generating a plurality of interim filter coefficients based on adapting the plurality of interim feedback filter coefficients from the threshold state of the plurality of adapted feedback filter coefficients based on the input signal and the feedback signal; and generating a plurality of interim feedback cancellation signals based on the plurality of interim feedback filter coefficients.

9. A hearing assistance device feedback cancellation system, the system comprising:

an input transducer to transduce an acoustic signal into a transduced signal, the transduced signal including an input signal and a feedback signal;

a memory;

a processor configured to execute instructions to:

determine a plurality of initial feedback filter coefficients based on the input signal and the feedback signal;

generate a feedback cancellation signal based on the initial feedback filter coefficients, the feedback cancellation signal configured to be combined with the input signal and the feedback signal to cancel the feedback signal;

detect a reduced input sound level within the input signal subsequent to the generation of the feedback cancellation signal, the reduced input sound level indicating an ambient sound level is substantially equal to or below a noise threshold, the noise threshold determined based on estimated noise floor values;

determine a plurality of preceding filter coefficients in response to the detection of the reduced input sound level, the plurality of preceding filter coefficients corresponding to a preceding state of filter coefficients immediately prior to the detection of the reduced input sound level;

determine a plurality of adapted feedback filter coefficients in response to the detection of the reduced input sound level, the plurality of adapted filter coefficients determined based on adapting the plurality of adapted feedback filter coefficients from the plurality of preceding filter coefficients toward a plurality of initialized feedback filter coefficient values, the plurality of adapted feedback filter coefficients to reduce acoustic leakage feedback, the plurality of initialized feedback filter coefficient values determined based on an initial fitting of the hearing assistance device;

generate an adapted feedback cancellation signal based on the plurality of adapted feedback filter coefficients; and generate an adapted feedback cancelled output based on a combination of the adapted feedback cancellation signal and the input signal; and an output transducer to transduce the adapted feedback cancelled output.

10. The system of claim 9, wherein the processor is further configured to execute instructions to:

determine a plurality of varying noise floor values during operation of the hearing assistance device; and update the noise threshold based on the plurality of noise floor values.

11. The system of claim 10, wherein the detection of the reduced input sound level includes determining that the input signal is substantially equal to or below the noise threshold.

12. The system of claim 10, wherein the processor is further configured to execute instructions to identify a plurality of preceding filter coefficients, the plurality of preceding filter coefficients corresponding to a preceding state of filter coefficients immediately prior to the detection of the reduced input sound level;

wherein the determination of the plurality of adapted feedback filter coefficients includes setting the plurality of adapted feedback filter coefficients to the preceding state of filter coefficients.

13. The system of claim 10, wherein the processor is further configured to execute instructions to compare the input signal against a divergent signal threshold, wherein the detection of the reduced input sound level within the input signal is based on a characteristic of the input signal falling below the divergent signal threshold.

14. The system of claim 13, wherein:

the divergent signal threshold includes a dynamic threshold; and the dynamic threshold is determined based on a current state of the plurality of adapted feedback filter coefficients and based on a known acoustic feedback path determined during an initial fitting.

15. The system of claim 9, wherein the detection of the reduced input sound level includes detecting a filter coefficient divergence.

16. The system of claim 9, wherein the processor is further configured to execute instructions to:

detect that the ambient sound level has risen above the noise threshold;

determine, upon detecting that the ambient sound level has risen above the noise threshold, a threshold state of the plurality of adapted feedback filter coefficients;

generate a plurality of interim filter coefficients based on adapting the plurality of interim feedback filter coefficients from the threshold state of the plurality of adapted feedback filter coefficients based on the input signal and the feedback signal; and generate a plurality of interim feedback cancellation signals based on the plurality of interim feedback filter coefficients.

17. At least one non-transitory machine-readable storage medium, comprising a plurality of instructions that, responsive to being executed with processor circuitry of a computer-controlled device, cause the computer-controlled device to:

receive an input signal and a feedback signal at a hearing assistance device;

determine a plurality of initial feedback filter coefficients based on the input signal and the feedback signal;

generate a feedback cancellation signal based on the initial feedback filter coefficients, the feedback cancellation signal configured to be combined with the input signal and the feedback signal to cancel the feedback signal;

detect a reduced input sound level within the input signal subsequent to the generation of the feedback cancellation signal, the reduced input sound level indicating an ambient sound level is substantially equal to or below a noise threshold, the noise threshold determined based on estimated noise floor values;

determine a plurality of preceding filter coefficients in response to the detection of the reduced input sound level, the plurality of preceding filter coefficients corresponding to a preceding state of filter coefficients immediately prior to the detection of the reduced input sound level;

determine a plurality of adapted feedback filter coefficients in response to the detection of the reduced input sound level, the plurality of adapted filter coefficients determined based on adapting the plurality of adapted feedback filter coefficients from the plurality of preceding filter coefficients toward a plurality of initialized feedback filter coefficient values, the plurality of adapted feedback filter coefficients to reduce acoustic leakage feedback, the plurality of initialized feedback filter coefficient values determined based on an initial fitting of the hearing assistance device; and generate an adapted feedback cancellation signal based on the plurality of adapted feedback filter coefficients.

18. The non-transitory machine-readable medium of claim 17, the instructions further causing the computer-controlled device to:

determine a plurality of varying noise floor values during operation of the hearing assistance device; and update the noise threshold based on the plurality of varying noise floor values.

19. The non-transitory machine-readable medium of claim 18, the instructions further causing the computer-controlled device to identify a plurality of preceding filter coefficients, the plurality of preceding filter coefficients corresponding to a preceding state of filter coefficients immediately prior to the detection of the reduced input sound level;

wherein the determination of the plurality of adapted feedback filter coefficients includes setting the plurality of adapted feedback filter coefficients to the preceding state of filter coefficients.

20. The non-transitory machine-readable medium of claim 18, the instructions further causing the computer-controlled device to:

detect that the ambient sound level has risen above the noise threshold;

determine, upon detecting that the ambient sound level has risen above the noise threshold, a threshold state of the plurality of adapted feedback filter coefficients;

generate a plurality of interim filter coefficients based on adapting the plurality of interim feedback filter coefficients from the threshold state of the plurality of adapted feedback filter coefficients based on the input signal and the feedback signal; and generate a plurality of interim feedback cancellation signals based on the plurality of interim feedback filter coefficients.

* * * * *